US 8,452,099 B2

(12) United States Patent
Reddy

(10) Patent No.: US 8,452,099 B2
(45) Date of Patent: May 28, 2013

(54) OPTICAL CHARACTER RECOGNITION (OCR) ENGINES HAVING CONFIDENCE VALUES FOR TEXT TYPES

(75) Inventor: Prakash Reddy, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 231 days.

(21) Appl. No.: 12/954,865

(22) Filed: Nov. 27, 2010

(65) Prior Publication Data

US 2012/0134589 A1    May 31, 2012

(51) Int. Cl.
*G06K 9/00*    (2006.01)

(52) U.S. Cl.
USPC .......................................................... 382/187

(58) Field of Classification Search
USPC ........................... 382/182–189, 229, 173–178
See application file for complete search history.

(56) References Cited

U.S. PATENT DOCUMENTS

| 7,047,238 | B2 * | 5/2006 | Tada et al. .............................. 1/1 |
| 7,092,567 | B2 | 8/2006 | Ma et al. |
| 7,240,062 | B2 | 7/2007 | Andersen et al. |
| 7,627,177 | B2 | 12/2009 | Tzadok et al. |
| 7,650,035 | B2 * | 1/2010 | Vincent et al. ................. 382/225 |
| 7,734,092 | B2 * | 6/2010 | Curtis et al. .................. 382/182 |
| 7,742,642 | B2 | 6/2010 | Goldstein |
| 8,014,604 | B2 * | 9/2011 | Tzadok et al. ................. 382/177 |
| 2011/0123115 | A1 * | 5/2011 | Lee et al. ....................... 382/185 |

* cited by examiner

*Primary Examiner* — Samir Ahmed
*Assistant Examiner* — Totam Le

(57) ABSTRACT

An image of a known text sample having a text type is generated. The image of the known text sample is input into each OCR engine of a number of OCR engines. Output text corresponding to the image of the known text sample is received from each OCR engine. For each OCR engine, the output text received from the OCR engine is compared with the known text sample, to determine a confidence value of the OCR engine for the text type of the known text sample.

18 Claims, 5 Drawing Sheets

OPTICAL CHARACTER RECOGNITION (OCR) ENGINES HAVING CONFIDENCE VALUES FOR TEXT TYPES

BACKGROUND

Text is frequently electronically received in a non-textually editable form. For instance, data representing an image of text may be received. The data may have been generated by scanning a hardcopy of the image using a scanning device. The text is not textually editable, because the data represents an image of the text as opposed to representing the text itself in a textually editable and non-image form, and thus cannot be edited using a word processing computer program, a text editing computer program, and so on. To convert the data to a textually editable and non-image form, optical character recognition (OCR) may be performed on the image, which generates data representing the text in a textually editable and non-image form, so that the data can be edited using a word processing computer program, a texting editing computer program, and so on.

DETAILED DESCRIPTION

Figure 1:
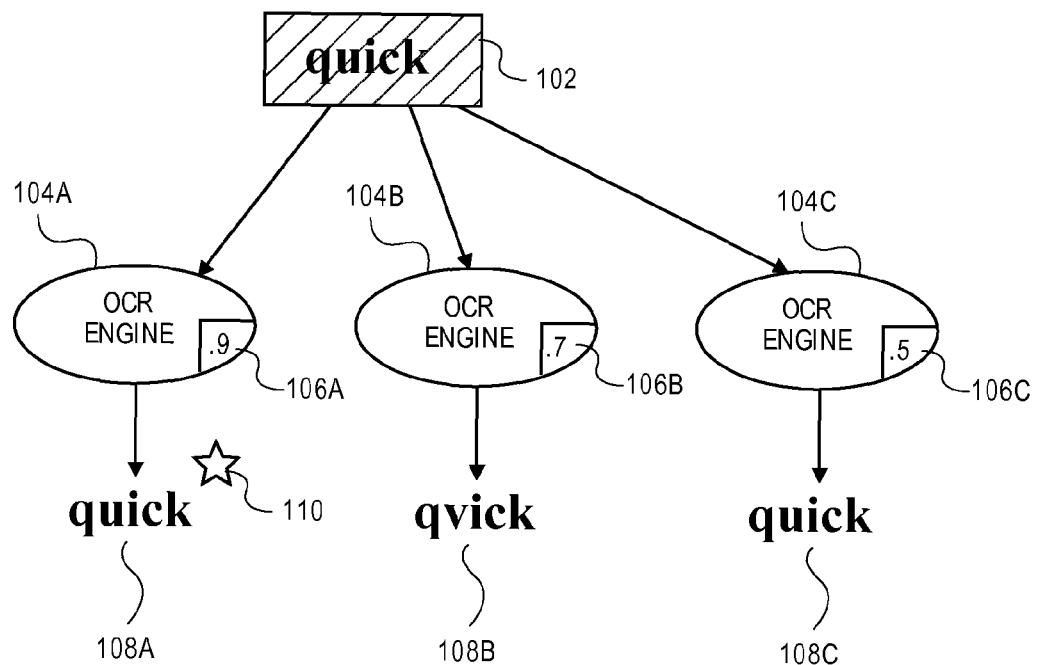
FIG. 1 is a diagram illustratively depicting how multiple OCR engines can be used to convert an image of text into text in non-image form, according to an example of the disclosure.

As noted in the background second, data can represent an image of text, as opposed to representing the text itself in a textually editable and non-image form that can be edited using a word processing computer program, a text editing computer program, and so on. To convert the data to a textually editable and non-image form, optical character recognition (OCR) may be performed on the image. Performing OCR on the image generates data representing the text in a textually editable and non-image form, so that the data can be edited using a computer program like a word process computer program or a text editing computer program.

However, OCR is not perfect. That is, even the best OCR techniques do not yield 100% accuracy in converting an image of text to a non-image form of the text. It is said that an OCR technique is performed by an OCR engine, such as an OCR computer program. Different OCR engines may perform different types of OCR techniques. Furthermore, different OCR engines may be able to more accurately perform OCR on images of text of different text types.

For example, one OCR engine may be able to more accurately perform OCR on images of text in one font, whereas another OCR engine may be able to more accurately perform OCR for images of text in another font. As another example, one OCR engine may be able to more accurately perform OCR on images of text that is underlined, whereas another OCR engine may be able to more accurately perform OCR for images of the same text but that is not underlined. A given image of text, however, may include text of different text types. As such, it is difficult to select one OCR engine that is most accurately able to perform OCR on each different text type.

Disclosed herein are approaches to compensate for these drawbacks of OCR techniques. Specifically, each of a number of different OCR engines has a confidence value for each of a number of different text types. When an image of unknown text having a given text type is received, the image is input into each OCR engine, and output text corresponding to this image is received from each OCR engine. If the output text received from each OCR engine is not identical, then the output text from one OCR engine is selected as at least provisionally correct for the unknown text, based on the confidence values of the OCR engines for the given text type of the unknown text.

The confidence values for an OCR engine can be determined for a particular text type by generating an image of a known text sample having this text type. The image is input into the OCR engine to receive output text corresponding to the known text sample from the OCR engine. The output text received from the OCR engine is compared to the known text sample to determine the confidence value of the OCR engine for this text type. This process is repeated for known text samples of different text types, and for different OCR engines, to determine the confidence values for each OCR engine for each different text type.

FIG. 1 illustratively depicts how multiple OCR engines can be used to convert an image of text into text in non-image form, according to an example of the disclosure. There is data representing an image 102 of text including the word quick," where the text is of a particular text type, such as a particular font, and so on. The image 102 is shaded in FIG. 1 just to represent the fact that it is an image, as opposed to textually editable data in non-image form. For instance, the data representing the image 102 may be bitmap data in BMP, JPG, or TIF file format, among other image file formats. The data representing the image 102 is not textually editable by computer programs like word processing and text editing computer programs. In general, then, shading is used in FIG. 1 to convey that a word is represented in image form.

The image 102 is input into three OCR engines 104A, 104B, and 104C, which are collectively referred to as the OCR engines 104, in the example of FIG. 1. Each OCR engine 104 performs a different type of OCR technique to convert the image 102 to text in non-image form, which may be textually editable by a computer program like a word processing computer program or a text editing computer program. The OCR engines 104 have associated confidence values 106A, 106B, and 106C, respectively, which are collectively to as the confidence values 106. The confidence value 106 indicates how accurately it has been determined that the corresponding OCR engine 104 converts images of text in the particular text type of the text within the image 102 to text in non-image form.

The OCR engines 104 convert the image 102 to data representing text 108A, 108B, and 108C, respectively, which are collectively referred to as the text 108. The data representing each text 108 may be formatted in accordance with the ASCII or Unicode standard, for instance, and may be stored in a TXT, DOC, or RTF file format, among other text-oriented file formats. The data representing each text 108 can include a byte, or more than one byte, for each character of the text, in accordance with a standard like the ASCII or Unicode standard, among other standards to commonly represent such characters.

For example, consider the letter "q" in the text. A collection of pixels corresponds to the location of this letter within the image 102. If the image is a black-and-white image, each pixel is on or off, such that the collection of on-and-off pixels forms an image of the letter "q." Note that this collection of pixels may differ depending on how the image was generated. For instance, one scanning device may scan a hardcopy of the text such that there are little or no artifacts (i.e., extraneous pixels) within the part of the image corresponding to the letter "q." By comparison, another scanning device may scan the hardcopy such that there are more artifacts within the part of the image corresponding to this letter.

From the perspective of a user, the user is able to easily distinguish the part of each image as corresponding to the letter "q." However, the portions of the images corresponding to the letter "q" are not identical to one another, and are not in correspondence with any standard. As such, without performing a process like OCR, a computing device is unable to discern that the portion of each image corresponds to the letter "q."

By comparison, consider the letter "q" within the text 108 representing the text in a non-image form that may be textually editable. The letter is in accordance with a standard, like the ASCII or Unicode standard, by which different computing devices know that this letter is in fact the letter "q." From the perspective of a computing device, the computing device is able to discern that the portion of the data representing this letter within the text 108 indeed represents the letter "q."

In the example of FIG. 1, the OCR engine 104A correctly output the text 108A "quick" as corresponding to the image 102. Likewise, the OCR engine 104C correctly output the text 108C "quick" as corresponding to the image 102. However, the OCR engine 104B incorrectly output the text 108B "qvick" as corresponding to the image 102. As such, the text 108 output by the OCR engines 104 are not identical as to the text represented within the image 102.

Therefore, which of the text 108 at least provisionally correctly corresponds to the text represented within the image 102 is selected based on the confidence values 106 of the OCR engines 104 for the text type of this text. As depicted in FIG. 1, the OCR engine 104A has a confidence value of 0.9 for this type of text, whereas the OCR engine 104B has a confidence value of 0.7, and the OCR engine 104C has a confidence value of 0.5. It may be decided to select the text 108 that was output by the OCR engine 104A having the highest confidence value for the text type of the text represented within the image 102. As such, in the example of FIG. 1, the text 108A is selected, as indicated by the star 110 in FIG. 1, as at least provisionally correct for the text within the image 102.

Figure 2:
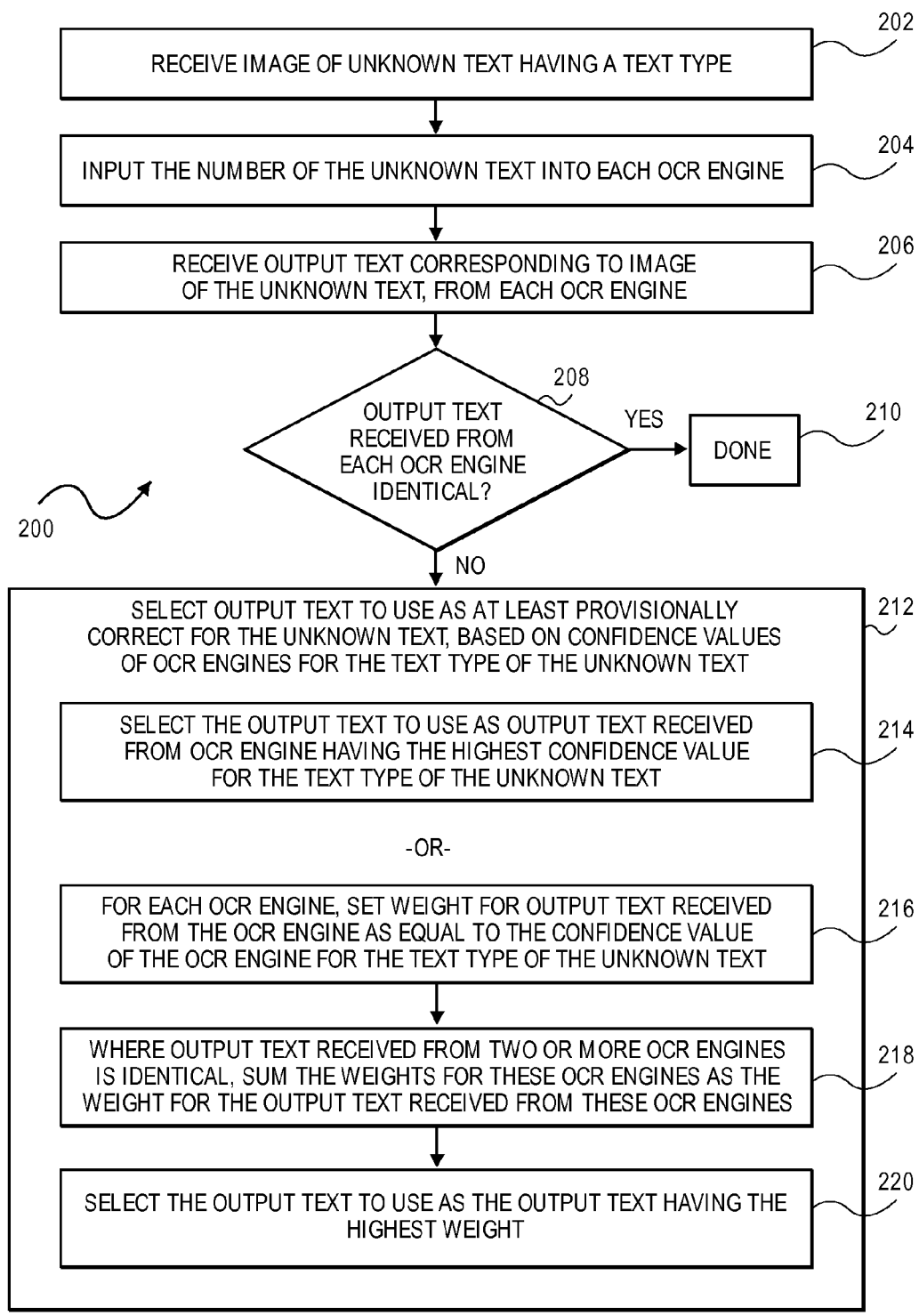
FIG. 2 is a flowchart of a method for using multiple OCR engines to convert an image of unknown text into text in non-image form, according to an example of the disclosure.

FIG. 2 shows a method 200 for using multiple OCR engines to convert an image of unknown text into text in non-image form, according to an example of the invention. As with other methods disclosed herein, the method 200 can be performed by a processor of a computing device, such as a desktop or a laptop computer. For example, a non-transitory computer-readable data storage medium may store a computer program, such that execution of the computer program by the processor results in the method 200 being performed. The method 200 can be performed without any user interaction.

An image of unknown text having a text type is received (202). The text is unknown in that there is not a corresponding version of the text in non-image form. The text type of the text may be one or more of the following: a particular type of font; a particular font size; whether or not the text is italicized; whether or not the text is bolded; whether or not the text is underlined; and whether or not the text has been struck through. These text types can be respectively considered as font type; font size; presence of italics; presence of bold; presence of underlining; and presence of strikethrough.

The text type of the unknown text in the image is a priori known, or is otherwise determined. For example, existing OCR techniques can be employed to determine the text type of the unknown text. Furthermore, for the purposes of the method 200, it is assumed that the unknown text is a single word. However, more generally, the method 200 is applicable to each word of multiple words represented within the image.

The definition of a word herein can be one or more characters between a leading space, or a leading punctuation mark, and a lagging space, or a lagging punctuation mark. Examples of punctuation marks include periods, commas, semi-colons, colons, and so on. As such, a word can include non-letter characters, such as numbers, as well as other non-letter characters, such as various symbols. Furthermore, a hyphenated word (i.e., a word containing a hyphen) can be considered as one word, including both parts of the word, to either side of the hyphen, or each part of the word may be considered as a different word.

The image of the unknown text is input into each of a number of OCR engines that use different OCR techniques to convert the image into text in a non-image form (204). As such, output text corresponding to the image of the unknown text is received from each OCR engine (206), in non-image form. The output text received from each OCR engine may be identical, or may be different. For example, for an image of unknown text A, one OCR engine may output text A1 as corresponding to this image, whereas two other OCR engines may output text A2 as corresponding to this image, where A2 represents different text from A1, and it is not known a priori which of A1 and A2 correctly corresponds to A, since the text A within the image is unknown.

If the output text received from each OCR engine is identical, then the method 200 is finished (210). In this case, it is concluded that the output text received from each OCR engine at least provisionally corresponds correctly to the unknown text within the image. For example, for an image of unknown text A, if each OCR engine outputs text A1, then it is concluded that A1 at least provisionally corresponds correctly to A.

However, if the output text received from each OCR engine is not identical, then the output text from one of the OCR engines is selected as at least provisionally correct for the unknown text within the image, based on the confidence values of the OCR engines for the text type of the unknown text (212). How this output text is selected based on the confidence values of the OCR engines for the text type of the unknown text can vary. For example, the output text may be selected as the output text received from the OCR engine having the highest confidence value for the text type of the unknown text (214), as described above in relation to FIG. 1.

As another example, for each OCR engine, a weight for the output text received from this OCR engine may be set equal to the confidence value of the OCR engine for the text type of the unknown text (216). Where the output text received from two or more OCR engines is identical, the sum of the weights for these OCR engines is set as the weight for the output text received from these OCR engines (218). The output text that is selected as at least provisionally correct for the unknown text within the image is the output text that has the highest weight (220).

For example, there may be four OCR engines that have confidence values of 0.9, 0.8, 0.8, and 0.7 for the text type of the unknown text of the image. The OCR engine having the confidence value of 0.9 may output text A1 as corresponding to the unknown text of the image. The other three OCR engines may, by comparison, output text A2 as corresponding to the unknown text of the image. In conjunction with parts 216, 218, and 220, then, the weight for the text A1 is 0.9, whereas the weight for the text A2 is 0.8+0.8+0.7=2.3. Therefore, the output text selected as at least provisionally correct for the unknown text within the image is the text A2, even though the OCR engine outputting the text A1 has the highest confidence value for the text type of the unknown text.

The method 200 can be performed on a word-by-word basis for multiple words within the unknown text of an image. The text type of each such word may further be different. For example, different words within the text may have different fonts, different font sizes, some words may be underlined whereas other words may not be underlined, some words may be italicized whereas other words may not be italicized, and so on. Each OCR engine has a confidence value for each different text type.

For example, one OCR engine may have a confidence value for a particular font regardless of size, another OCR engine may have a confidence value for different sizes of a particular font, and so on. As another example, one OCR engine may have a confidence value for underlined text regardless of font, whereas another OCR engine may have a confidence value that is the same for a particular font regardless of whether the text is underlined. As a third example, a given OCR engine may have one confidence value for underlined text that is not italicized, another confidence value for italicized text that is not underlined, and a third confidence value for text that is both underlined and italicized.

Figure 3:
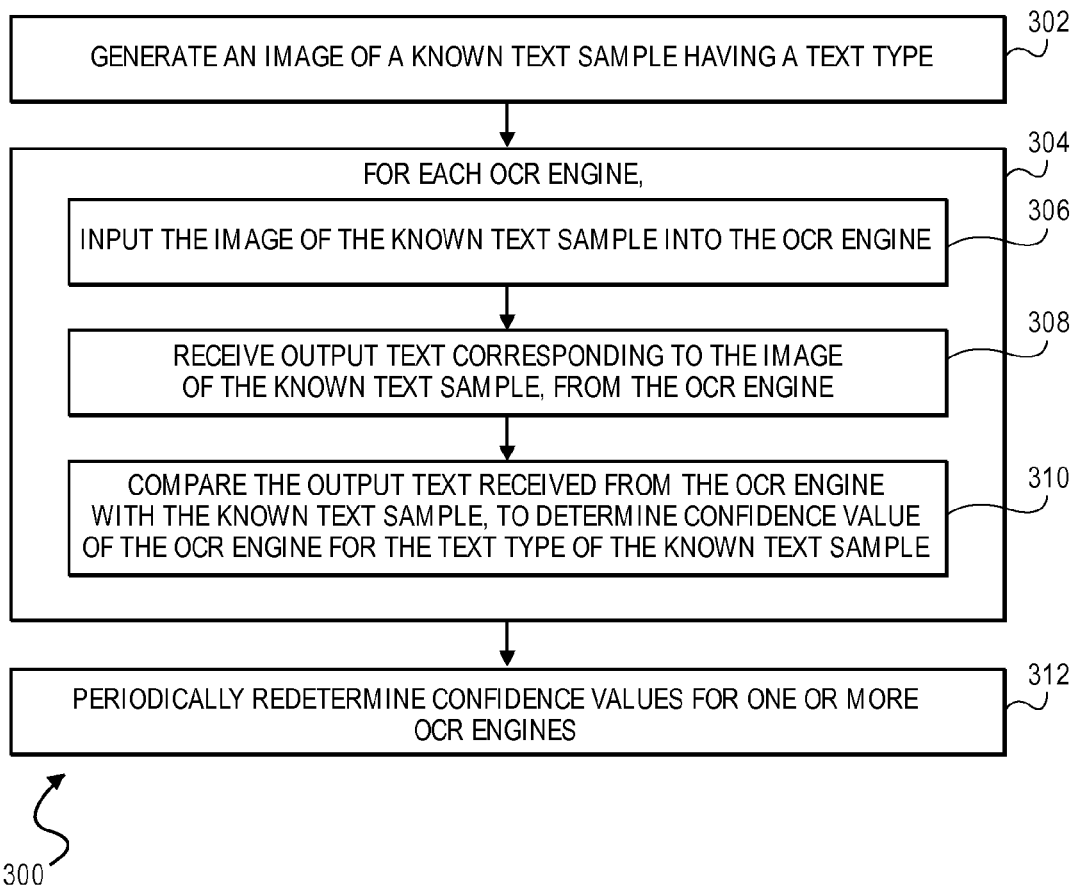
FIG. 3 is a flowchart of a method for determining the confidence values of OCR engines for a particular text type, according to an example of the disclosure.

FIG. 3 shows a method 300 for determining a confidence value of each of a number of OCR engines for a particular text type, according to an example of the disclosure. The method 300 is repeated for each different text type that is likely to be encountered within unknown text of images when the method 200 is performed. The method 300 presumes that there is a known text sample of a particular text type. This text sample is known in that the text in non-image form is known a priori. The text sample may include one or more words, where each word includes one or more characters.

An image of the known text sample is generated (302). For example, the image may be generated by printing the known text sample using a printing device, and then by scanning the image using a scanning device to generate data representing the image. As another example, a type of printer driver that generates images from text can be used to generate the image of the known text sample.

As a third example, the image can be generated by obtaining an image of text, where the text is not known a priori. A user can then manually input the text within the image, resulting in the text being known, and that the text of the image becomes the known text sample. As a related example, OCR may be performed on such an image of text, and the results of the OCR manually verified and corrected if there are any errors, resulting in the text being known, such that the text of the image becomes the known text sample.

For each OCR engine, the following is then performed (304). The image of the known text sample is input into the OCR engine (306). Output text corresponding to the image of the known text sample is subsequently received from the OCR engine (308). The output text received from the OCR engine is compared with the known text sample, to determine the confidence value of the OCR engine for the text type of the known text sample (310).

The confidence values for each OCR engine of one or more of the OCR engines can be periodically redetermined (312). For instance, when an OCR engine is upgraded to improve its OCR technique, the confidence values for the OCR engine can be responsively updated. As another example, new known text samples may be added, such that the confidence values for the OCR engines are responsively redetermined. As such, the process of the method 400 can be dynamic, where confidence values for the OCR engine may be periodically redetermined as desired.

Figure 4A:
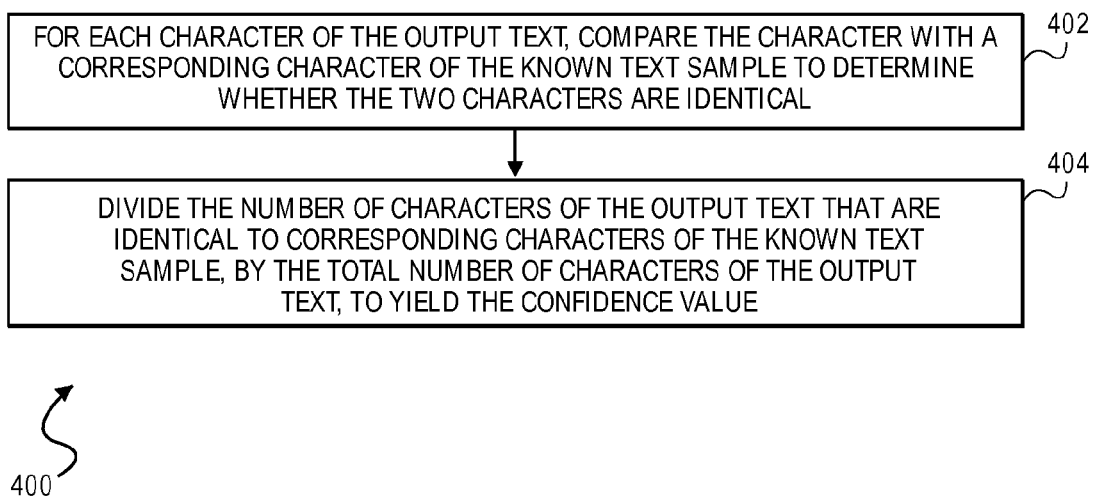
FIGS. 4A, 4B, and 4C are flowcharts of methods for particularly calculating the confidence values of OCR engines for a particular text type within a part of the method of FIG. 3, according to varying examples of the disclosure.
Figure 4B:
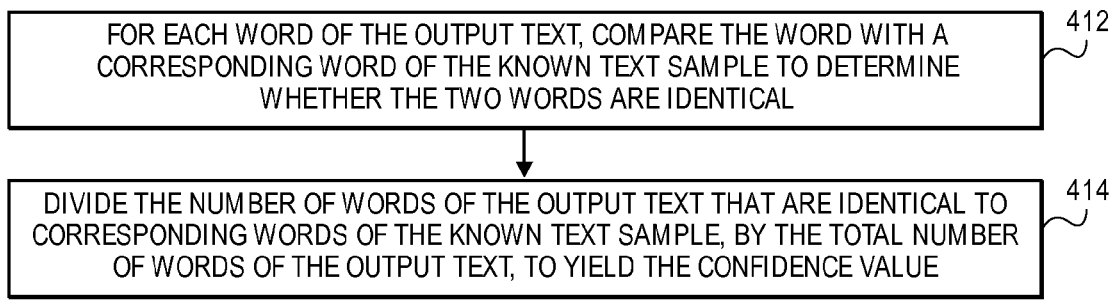
Figure 4B:
Figure 4C:
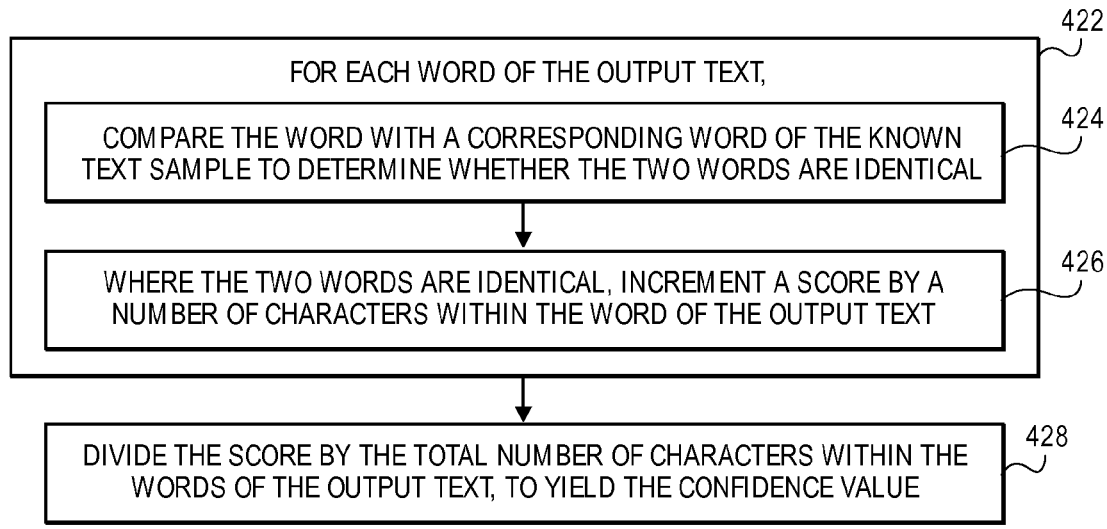
Figure 4C:

FIGS. 4A, 4B, and 4C show methods 400, 410, and 420, respectively, that can be performed in part 310 of the method 300 to determine the confidence value of an OCR engine for the text type of the known text sample by comparing the output text received from the OCR engine with the known text sample, according to different examples of the disclosure. In the method 400 of FIG. 4A, each character of the output text is compared to a corresponding character of the known text sample to determine whether the two characters are identical (402). For instance, each character of each word of the output text may be compared to a corresponding character of the known text sample.

The number of characters of the output text that are identical to corresponding characters of the known text sample is then divided by the total number of characters of the output text to yield the confidence value of the OCR engine for the text type of the known text sample (404). For instance, the number of characters of the words of the output text that are identical to corresponding characters of the known text sample may be divided by the total number of characters of the words of the output text to yield this confidence value. The method 400 is repeated for each OCR engine, to determine the confidence value of each OCR engine for the text type of the known text sample.

In the method 410 of FIG. 4B, each word of the output text is compared to a corresponding word of the known text sample to determine whether the two words are identical (404). The number of words of the output text that are identical to corresponding words of the known text sample is divided by the total number of words of the output text to yield the confidence value of the OCR engine for the text type of the known text sample (414). The method 410 is also repeated for each OCR engine, to determine the confidence value of each OCR engine for the text type of the known text sample.

In the method 420 of FIG. 4C, the following is performed for each word of the output text (422). The word of the output text is compared to a corresponding word of the known text sample to determine whether the two words are identical (424). If the two words are identical, then a score is incremented by the number of characters within the word of the output text (426). It is noted that this score is initially reset to zero when the method 420 is first performed for a particular OCR engine. The score ultimately is divided by the total number of characters within the words of the output text to yield the confidence value of the OCR engine for the text type of the known text sample (428). As before, the method 420 is repeated for each OCR engine, to determine the confidence value of each OCR engine for the text type of the known text sample.

The methods 400, 410, and 420 thus vary in how the confidence value of an OCR engine for the text type of the known text sample is determined. The method 400 determines the confidence value by inspecting individual characters for accuracy, whereas the method 410 determines the confidence value by inspecting each word as a whole for accuracy. The method 420 is similar to the method 410, but effectively weights words correctly recognized by the OCR engine by the number of characters within the words. For instance, a correctly recognized word that has twelve characters affects the confidence value of the OCR engine for the text type of the known text sample more than a correctly recognized word that has four characters does.

Variations and extension can be made to the methods that have been described above. For instance, in the methods 410 and 420 of FIGS. 4B and 4C, it may be determined that a particular OCR engine consistently makes the same error for a given word. For example, the word "hello" may be consistently recognized by a particular OCR engine as the word "he11o." As such, this error can be taken into account in determining the confidence value in question for the particular OCR engine. That is, the confidence value for the particular OCR engine as to this word may be set to zero. Therefore, when the particular OCR engine identifies a word in an image of unknown text as being "he11o" in the method 200 of FIG. 2, this output text by this particular OCR engine is not considered.

Figure 5:
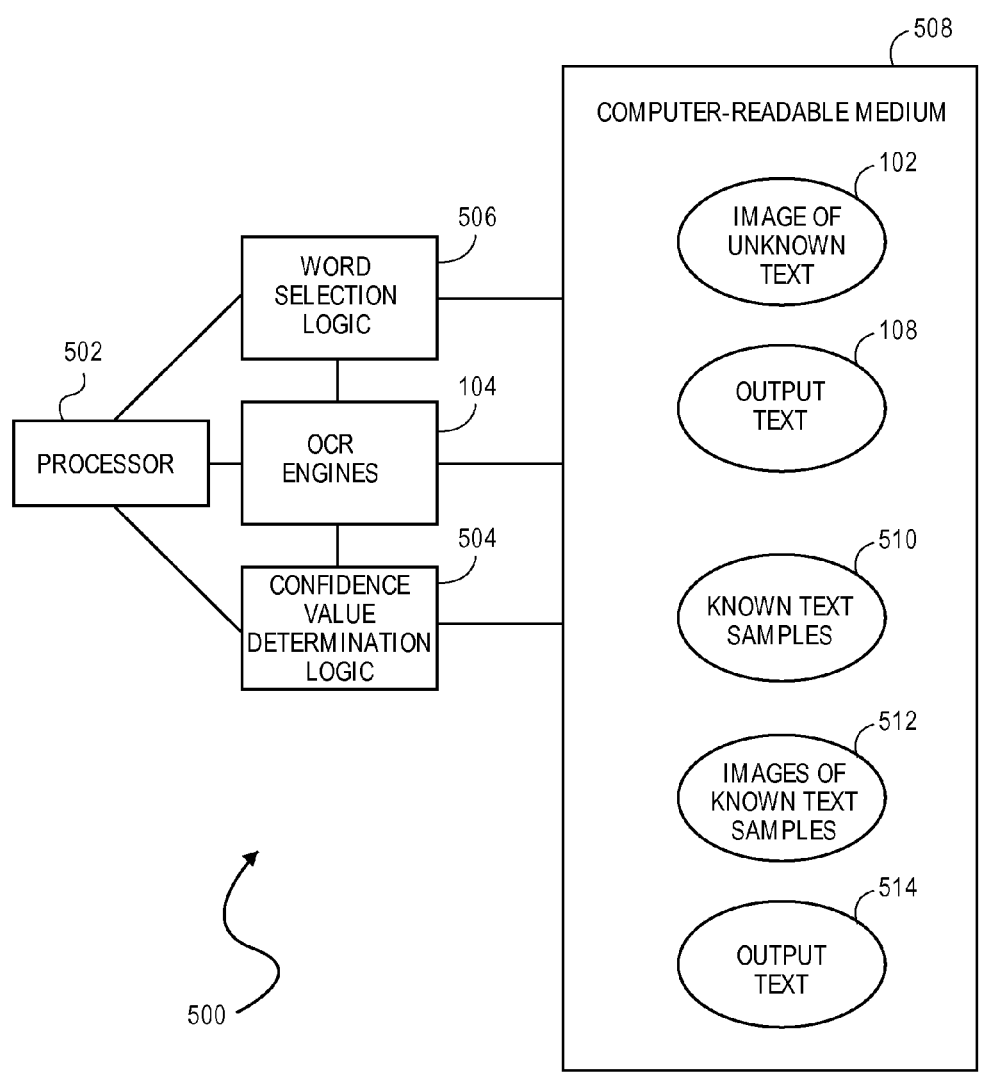
FIG. 5 is a diagram of a system, according to an example of the disclosure.

In conclusion, FIG. 5 shows a rudimentary system 500, according to an example of the invention. The system 500 may be implemented at one or more computing devices, such as desktop or laptop computers. The system 500 includes a processor 502, multiple OCR engines 104, logic 504 and 506, and a non-transitory computer-readable data storage medium 508. Example of such computer-readable media include volatile and non-volatile semiconductor memory, magnetic media, and optical media, as well as other types of non-transitory computer-readable data storage media.

The computer-readable medium 508 stores data representing an image 102 of unknown text, as well as output text 108 corresponding to this image 102. The computer-readable medium 508 also stores known text samples 510, images 512 of the known text samples 510, and output text 514 corresponding to the images 512. The OCR engines 104 generate the output text 108 after being input the image 102, and also generate the output text 514 after being input the images 512.

The confidence value determination logic 504 is executed by the processor 502, and thus may be implemented as one or more computer programs stored on the computer-readable medium 508, or another computer-readable medium. The logic 504 determines the confidence level of each OCR engine 104 by performing the method 300 of FIG. 3. As such, the logic 504 generates the images 512 from the known text samples 510, and causes the OCR engines 104 to generate the output text 514 from the images 512.

The word selection logic 506 is also executed by the processor 502, and thus may also be implemented as one or more computer programs stored on the computer-readable medium 508, or another computer-readable medium. The logic 506 selects which of the output text 108 to use as provisionally correct for the unknown text of the image 102 by performing the method 200 of FIG. 2. As such, the logic 104 receives the image 102, causes the OCR engines 104 to generate the output text 108 from the image 102, and selects which output text 108 to use for the unknown text of the image 102 based on the confidence values of the OCR engines 104 for the text type of this unknown text.

I claim:

1. A method comprising:
    for each known text sample of a plurality of known text samples, each known text sample having a text type,
        generating, by a processor, an image of the known text sample;
        for each optical character recognition (OCR) engine of a plurality of OCR engines, inputting the image of the known text sample, by the processor, into the OCR engine; receiving output text corresponding to the image of the known text sample, by the processor, from the OCR engine; and, comparing the output text received from the OCR engine with the known text sample, by the processor, to determine a confidence value of the OCR engine for the text type of the known text sample, wherein for each OCR engine of one or more of the OCR engines, periodically redetermining the confidence values of the OCR engine.

2. The method of claim 1 wherein the confidence values of a particular OCR engine of the OCR engines is redetermined responsive to the particular OCR engine being upgraded.

3. The method of claim 1, wherein the confidence values of each OCR engine of the one or more of the OCR engines is redetermined responsive to an additional known text sample being added to the plurality of known text samples.

4. The method of claim 1, wherein the text type of each known text sample comprises one or more of: a font type; a font size; presence of italics; presence of bold; presence of underlining; and, presence of strikethrough.

5. The method of claim 1, wherein comparing the output text received from the OCR engine with the known text sample to determine the confidence value of the OCR engine for the text type of the known text sample comprises:
    for each character of a plurality of characters of the output text, comparing the character with a corresponding character of the known text sample to determine whether the character of the output text is identical to the corresponding character of the known text sample;
    dividing a number of the characters of the output text that are identical to the corresponding characters of the known text sample, by a total number of the characters of the output text, to yield the confidence value of the OCR engine for the text type of the known text sample.

6. The method of claim 1, wherein comparing the output text received from the OCR engine with the known text sample to determine the confidence value of the OCR engine for the text type of the known text sample comprises:
    for each word of a plurality of words of the output text, comparing the word with a corresponding word of the known text sample to determine whether the word of the output text is identical to the corresponding word of the known text sample;
    dividing a number of the words of the output text that are identical to the corresponding words of the known text sample, by a total number of the word of the output text, to yield the confidence value of the OCR engine for the text type of the known text sample.

7. The method of claim 1, wherein comparing the output text received from the OCR engine with the known text sample to determine the confidence value of the OCR engine for the text type of the known text sample comprises:
    for each word of a plurality of words of the output text,
        comparing the word with a corresponding word of the known text sample to determine whether the word of the output text is identical to the corresponding word of the known text sample;
        where the word of the output text is identical to the corresponding word of the known text sample, incrementing a score by a number of characters within the word of the output text;

dividing the score by a total number of characters within the words of the output text, to yield the confidence value of the OCR engine for the text type of the known text sample.

8. The method of claim 1, wherein comparing the output text received from the OCR engine with the known text sample to determine the confidence value of the OCR engine for the text type of the known text sample comprises, where the OCR engine consistently makes a same error for a given word of the known text sample, setting the confidence value of the OCR engine for the given word as equal to zero.

9. The method of claim 1, further comprising:
receiving, by the processor, an image of unknown text having a given text type;
inputting the image of the unknown text, by the processor, into each OCR engine;
receiving output text corresponding to the image of the unknown text, by the processor, from each OCR engine;
where the output text received from each OCR engine is not identical, selecting the output text to use as at least provisionally correct for the unknown text, by the processor, based on the confidence values of the OCR engines for the given text type of the unknown text.

10. The method of claim 9, wherein selecting the output text to use comprises selecting the output text received from the OCR engine having a highest confidence value for the given text type of the unknown text.

11. The method of claim 9, wherein selecting the output text to use comprises:
for each OCR engine, setting a weight for the output text received from the OCR engine as equal to the confidence value of the OCR engine for the given text type of the unknown text;
where the output text received from two or more OCR engines of the plurality of OCR engines is identical, summing the weights for the two or more OCR engines as the weight for the output text received from the two or more OCR engines; and,
selecting the output text having a highest weight.

12. A non-transitory computer-readable data storage medium having a computer program stored thereon for execution by a processor to perform a method comprising:
receiving an image of unknown text having a text type;
inputting the image of the unknown text into each optical character recognition (OCR) engine of a plurality of OCR engines, each OCR having a confidence value for the text type;
receiving output text corresponding to the image of the unknown text from each OCR engine; and,
where the output text received from each OCR engine is not identical, selecting the output text to use as at least provisionally correct for the unknown text, based on the confidence values of the OCR engines for the text type of the unknown text by, for each OCR engine, setting a weight for the output text received from the OCR engine as equal to the confidence value of the OCR engine for the text type of the unknown text;
wherein the output text received from two or more OCR engines of the plurality of OCR engines is identical, summing the weights for the two or more OCR engines as the weight for the output text received from the two or more OCR engines; and,
selecting the output text having a highest weight.

13. The non-transitory computer-readable data storage medium of claim 12, wherein the text type comprises one or more of: a font type; a font size; presence of italics; presence of bold; presence of underlining; and, presence of strikethrough.

14. The non-transitory computer-readable data storage medium of claim 12, wherein selecting the output text to use comprises selecting the output text received from the OCR engine having a highest confidence value for the text type of the unknown text.

15. A computing system comprising:
a processor;
a computer-readable data storage medium to store an image of unknown text having a text type;
a plurality of optical character recognition (OCR) engines executable by the processor, each OCR engine having a confidence value for the text type, each OCR engine to generate output text corresponding to the image of the unknown text; and,
logic executable by the processor to, where the output text received from each OCR engine is not identical, select the output text to use as at least provisionally correct for the unknown text, based on the confidence values of the OCR engines for the text type of the unknown text, wherein, for each OCR engine, set a weight for the output text received from the OCR engine as equal to the confidence value of the OCR engine for the text type of the unknown text,
wherein if the output text received from two or more OCR engines of the plurality of OCR engines is identical, the weights for the two or more OCR engines are summed as the weight for the output text received from the two or more OCR engines; and, select the output text having a highest weight.

16. The computing system of claim 15, wherein the text type comprises one or more of: a font type; a font size; presence of italics; presence of bold; presence of underlining; and, presence of strikethrough.

17. The computing system of claim 15, wherein the logic is first logic,
wherein the computer-readable data storage medium is to further store a plurality of known text samples and an image of each known text sample, each known text sample having a given text type,
wherein each OCR engine is to generate output text corresponding to the image of each known text sample,
wherein the computing system further comprises second logic to, for each OCR engine, compare the output text generated by each OCR engine corresponding to the image of each known text sample with the known text sample, to determine a confidence value of the OCR engine for the given text type of the known text sample,
and wherein the text type of the unknown text is one or more of the given text types of the known text samples.

18. The computing system of claim 17, wherein the second logic, for each OCR engine of one or more of the OCR engines, periodically redetermines the confidence values of the OCR engine.

* * * * *

UNITED STATES PATENT AND TRADEMARK OFFICE
CERTIFICATE OF CORRECTION

| | | |
|---|---|---|
| PATENT NO. | : 8,452,099 B2 | Page 1 of 1 |
| APPLICATION NO. | : 12/954865 | |
| DATED | : May 28, 2013 | |
| INVENTOR(S) | : Prakash Reddy | |

It is certified that error appears in the above-identified patent and that said Letters Patent is hereby corrected as shown below:

In the Claims:

In column 8, line 13, in Claim 2, delete "claim 1" and insert -- claim 1, --, therefor.

Signed and Sealed this
Eighth Day of October, 2013

Teresa Stanek Rea
*Deputy Director of the United States Patent and Trademark Office*